Figure 1:
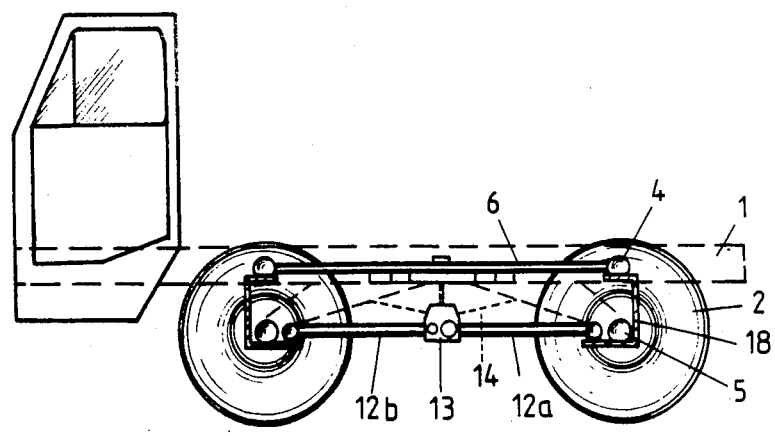

United States Patent [19]

Knuutinen

[11] Patent Number: 4,688,811
[45] Date of Patent: Aug. 25, 1987

[54] CHASSIS STRUCTURE OF VEHICLE

[76] Inventor: Hannu Knuutinen, Laiduntie 30, SF-70780 Kuopio, Finland

[21] Appl. No.: 842,258

[22] PCT Filed: Jun. 19, 1985

[86] PCT No.: PCT/FI85/00056
§ 371 Date: Feb. 20, 1986
§ 102(e) Date: Feb. 20, 1986

[87] PCT Pub. No.: WO86/00269
PCT Pub. Date: Jan. 16, 1986

[30] Foreign Application Priority Data

Jun. 21, 1984 [FI] Finland .................. 842534

[51] Int. Cl.[4] .................. B62A 61/10; B62A 3/02
[52] U.S. Cl. .................. 280/91
[58] Field of Search .................. 280/91, 104, 688, 691, 280/111

[56] References Cited

U.S. PATENT DOCUMENTS

| 3,273,912 | 9/1966 | Crockett | 280/104 |
| 3,471,166 | 10/1969 | Clark | 280/91 |
| 3,504,928 | 4/1970 | Reimer | 280/91 |
| 3,521,899 | 7/1970 | Whitehead | 280/91 |
| 3,977,693 | 8/1976 | Gamaunt | 280/91 |

FOREIGN PATENT DOCUMENTS

| 447703 | 7/1927 | Fed. Rep. of Germany . |
| 870646 | 3/1953 | Fed. Rep. of Germany . |
| 2256934 | 5/1973 | Fed. Rep. of Germany . |
| 1040882 | 10/1953 | France . |
| 116045 | 8/1926 | Switzerland . |
| 1222610 | 2/1971 | United Kingdom . |
| 1579797 | 11/1980 | United Kingdom . |

Primary Examiner—Richard A. Bertsch
Attorney, Agent, or Firm—Cushman, Darby & Cushman

[57] ABSTRACT

A chassis structure of a vehicle or a working machine, to which belong the axles (3) of the wheels (2) connected to the frame (1) of the vehicle, which axles are articulated to the frame in such a way, that the wheels have been arranged mobile in the height direction of the vehicle. The handling characteristics of the present vehicles and working machines on an uneven surface are bad. According to the invention the axles are connected to the frame of the vehicle or the working machine with the intermediation of fastening organs (4, 5), favourably ball-and-socket joins, placed on the opposite sides of the axles to be moved in the length direction of the vehicle in regard of the connection spot.

5 Claims, 6 Drawing Figures

CHASSIS STRUCTURE OF VEHICLE

The object of the invention is a chassis structure of a vehicle or a working machine, to which belong the axles of the wheels connected with the frame of the vehicle or the working machine, which are articulated to the frame in such a way, that the wheels have been arranged mobile in the height direction of the vehicle.

When driving with vehicles or working machines on an uneven surface such as in a terrain or on a road of a very bad condition the vehicles and working machines sway when their wheels hit the rises and depressions of the earth surface, whereby the driving of them is troublesome and their handling characteristics are poor. The axles of the wheels can be fastened articulated to the frame of the vehicle, whereby the weight will be divided evenly. When moving on an uneven surface the vehicles and working machines should be steered in the most efficient way and using the smallest possible turning radius, but off-the-road vehicles and working machines are troublesome to steer in a limited space.

The aim of the invention is to bring forward the chassis structure of the vehicle or working machine, by which better handling charcteristics compared with the known structures are achieved when driving on an uneven surface. Additionally, the aim of the invention is to bring forward a chassis structure, with the help of which the vehicles and working machines can be steered efficiently in the wished direction. Further the aim of the invention is to bring forward the chassis structure, which is easy to use and dependable.

The aim of the invention is achieved by means of the chassis structure,

According to the invention the axles of the vehicle or the working machine are connected to the frame of the vehicle or the working machine through the intermediation of fastening organs, favourably ball-and-socket joints placed on the opposed sides of the axles, to be moved in the length direction of the vehicle in regard of the connection spot. The axles are favourably ordinary rigid axles or other axles suitable for the purpose. The fastening organs make possible the mobile articulation of the axles and the moving of the wheels as well in the height as the length direction of the vehicle or the working machine either separately or simultaneously, e.g. when the wheels move in the height direction of the vehicle in accordance with the unevenness of the terrain and they are turned for steering of the vehicle. The fastening organs are placed on the opposite to the each other, whereby the connecting of the axle to the frame is easy.

The vehicle of the working machine can easily be equipped with a regulating device of the side declination, such as a manually operated or an automatic regulating device of the gyro horizon. In biaxial vehicles both axles can be tractive without differential intermediate gears, which is advantageous both in traction and in braking. The chassis structure in accordance with the invention is suitable for use in all vehicles and working machines, such as e.g. tractors, loaders, workers machine chassis, towed objects and corresponding. With the help of that the vehicle or the working machine can be steered with a very small turning radius or even transferred sidewise in certain applications. Due to the chassis structure the vehicle or working machine can be steered very efficiently in all kinds of terrain conditions and simultaneously preserve the efficiency and the grip of the wheels of the vehicle or the working machine, because all the wheels are pressed against the earth in all terrain conditions with the same force.

Figure 2:
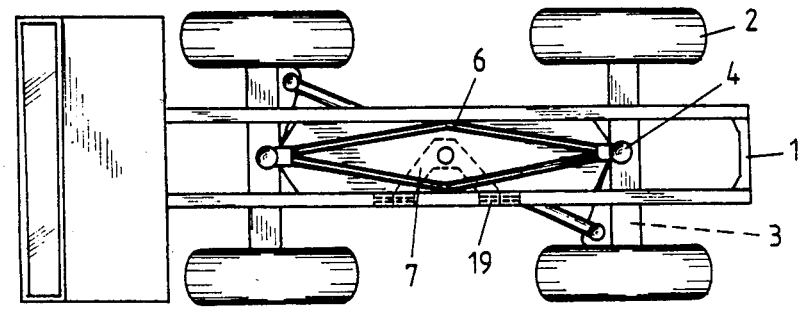
Figure 3:
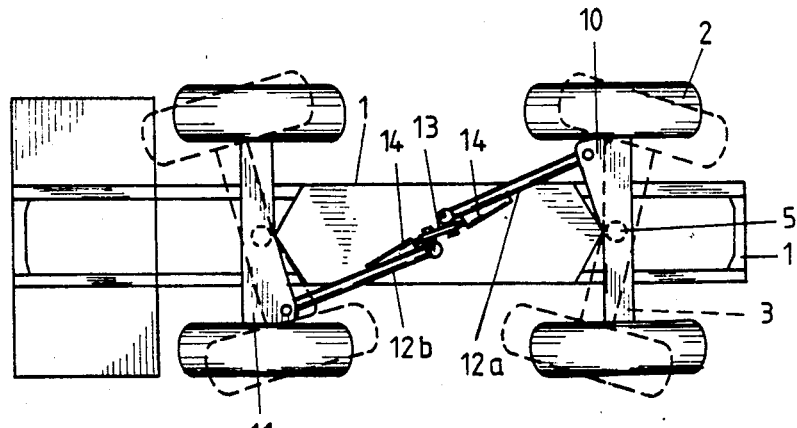
Figure 4:
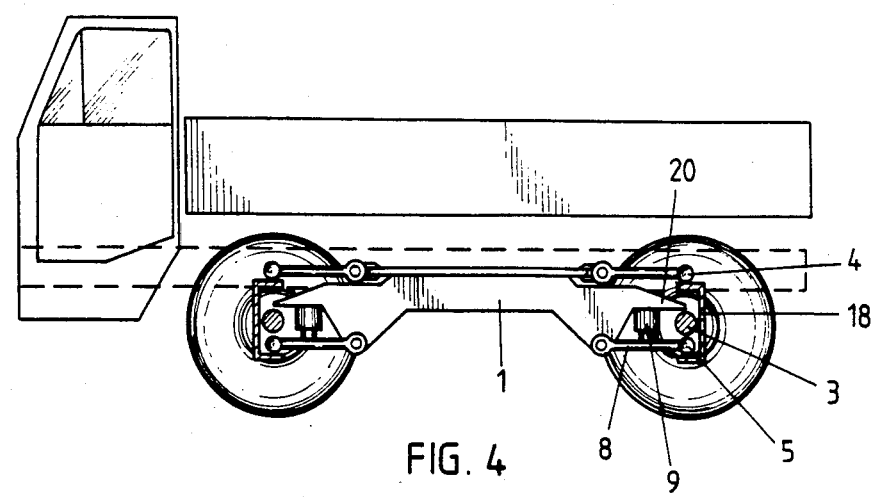
Figure 5:
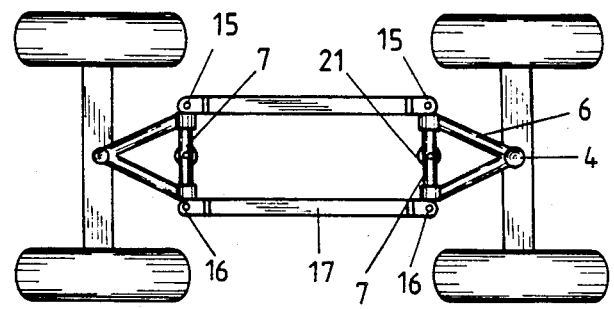
Figure 6:
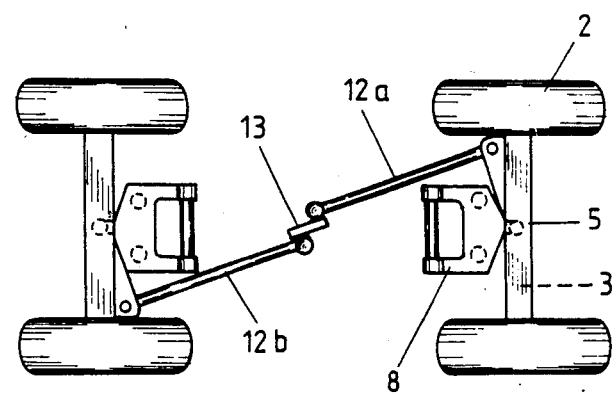

In the following the invention is explained more in detail by referring to the attached drawing, where The FIG. 1 presents an application in accordance with the invention of the chassis structure of a working machine seen from the side and partly in section, The FIG. 2 shows the chassis structure according to the FIG. 1 seen from above, The FIG. 3 shows the chassis structure according to the FIG. 1 seen from below, The FIG. 4 presents another application in accordance with the invention of the chassis structure of a vehicle seen from the side and partly in section, The FIG. 5 shows the chassis structure according to the FIG. 4 seen from above, and The FIG. 6 shows the chassis structure according to the FIG. 4 seen from below.

In FIGS. 1-3 is presented an application of the chassis structure in accordance with the invention used in an unsprung vehicle or working machine. The axles 3 are rigid axles, at the ends of which the wheels 2 are placed. The axles are from their middle articulated to the frame 1 of the vehicle or the working machine through the intermediation of the ball-and-socket joints 4, 5. Instead of the ball-and-socket joints corresponding organs, such as e.g. differential spiders can be used. The axle is fastened to the axial beam 18, to which the ball-and-socket joints 4, 5 in this application are fastened above and below the axle opposite to each other in the same line with the axle. The ball-and-socket joint 5 located below is connected directly to the body of the vehicle, which in the FIG. 1 is depicted in broken lines.

The ball-and-socket joint 4 fastened in the middle above the axle is connected to the supporting arm 6, which in this solution is arranged to connect both the axles of the vehicle. The supporting arm is mainly a parallelogram to its form and it is from its middle parts bearing attached to the end of the intermediary support 7, which intermediary support in this application has the form of a triangular supporter. The intermediary support is fastened by means of bearings 19 from the other end to the frame 1 of the vehicle.

The ends 10, 11 of the axles on the opposite sides of the vehicle are connected with each other through tie rods 12a, 12b, the other ends of which are connected articulated to the steering arm 13. The steering arm is articulated mobile to the frame 1. In addition to the chassis structure in the application presented in the FIGS. 1-3 the control cylinders 14 acting as power units, with the help of which the steering arm can be moved for steering of the vehicle. For the moving of the steering arm can, however, also other known for the purpose suitable devices be used.

When driving with a vehicle presented in the FIGS. 1-3 in uneven terrain the axle is declining in accordance with the unevenness of the terrain. Hereby the axle can decline due to the ball-and-socket joints 4, 5 so, that supporting arm 6 springs allowing a slight movement of the ball-and-socket joint in regard of the frame, at the same time supporting the axle and preventing swaying. When changing the direction of the vehicle the power unit 14 connected with the steering arm influence is exerted upon, which transfers the steering arm 13, and thereto fastened tie rods 12a, 12b in the wished direction. In FIG. 3 a position of the wheels is shown in broken lines, when turning the vehicle. The axles are able to turn resting on the ball-and-socket joints and steered as well as supported by the tie rods. In addition the tie rods are articulated to the steering arm, so they do not make an obstacle for the motion of the wheels and axles in the vertical direction of the vehicle.

In another application of the invention the tie rods are connected articulated to the steering arm by means of power units e.g. cylinders, when by moving the tie rods in regard to each other the position of the wheels can be changed so, that the vehicle can be transferred in the sideward direction.

In the application presented in FIGS. 4–6 the axle beam 18 of the axles is connected by means of the ball-and-socket joint 5 located below the axle to the bearer arm 8, which from its other end is articulated to the frame of the vehicle. To the frame of the vehicle is formed a protrusion and inbetween the bearer arm and the protrusion spring organs 9 are placed in such a way, that they from one end are supported against the bearer arm and from the other end against the frame, whereby the vehicle is suspended. The bearer arm, which can be e.g. a triangular supporter arm, can also be equipped with a torsion rod spring or with other as such known spring suspension solutions.

From the middle above the axle is connected by a ball-and-socket joint 4 to the supporting arm 6, which in this application is a triangular supporter arm, the supporting arm bearing attached from the ends of the arms to the supporting axle 7, which axle is fastened by means of bearings from the middle to the frame of the vehicle with bearing 21. The ends 15, 16 on the same side of the supporting arm's supporting axles are connected with each other by intermediary arms 17, which are articulated to the ends of the axles.

When moving the vehicle in an uneven terrain the wheels are able to move in the vertical direction resting on the ball-and-socket joints, whereat the upper ball-and-socket joint 4 can due to the supporting arm, the axle and the tie rods somewhat move in regard of the frame and the said organs at the same time support the structure and abate the swaying. The steering system is similar and the function of it corresponding to that in an unsprung vehicle.

The invention is not limited to the presented favourable applications, but the invention can vary within the limits of the claims. E.g. as steering device for instance hydraulicly boosted or by other known methods boosted control unit apparatuses can be used. In towed vehicles the front axle is arranged to follow the hauling vehicle by means of a drawing beam and to operate with articulated and supported tie rod the back axle.

I claim:

1. Chassis structure of vehicle or working machine, to which belong the axles (3) of the wheels (2) fastened into the frame (1) of the vehicle or the working machine, which axles are articulated to the frame in such way, that the wheels have been arranged to be mobile in the height direction of the vehicle and in the length direction of the vehicle in regard of the connection spot by connecting the axles to the frame through the intermediation of the fastening organs (4, 5) placed opposite each other above and below the middle of the axle, characterized in, that one of the fastening organs (4) is connected to the supporting arm (6), which is connected bearing attached to the intermediary support (7), which is connected to the frame of the vehicle bearing attached and, that the ends (10, 11) of the axles located on the opposite sides of the vehicle are connected with each other by a tie rod (12), to which belong two rods (12a, 12b), which are from their other end connected to the steering arm (13) articulated to the frame of the vehicle in order to steer the vehicle.

2. Chassis structure in accordance with the patent claim 1, characterized in, that the other fastening organ (5) is connected to the bearer arm (8), which is from its other end articulated to the frame.

3. Chassis structure in accordance with the patent claim 1, characterized in, the steering arm is fastened a power unit (14), which is arranged to move the steering arm and/or the tie rods in regard of the frame.

4. Chassis structure in accordance with claim 1, characterized in, that inbetween the bearer arm and the frame are placed spring organs (9), which from one end are supported against the bearer arm and from the other end against the frame.

5. Chassis structure in accordance with claim 1, characterized in, that the supporting arm (6) is a triangular supporter arm, which is bearing attached to the frame through the intermediation of the supporting axle (7) and, that the ends (15, 16) of the supporting axles on the same side are connected to each other by intermediary arms (17), which are articulated onto the ends of the axles.

* * * * *